Figure 1:
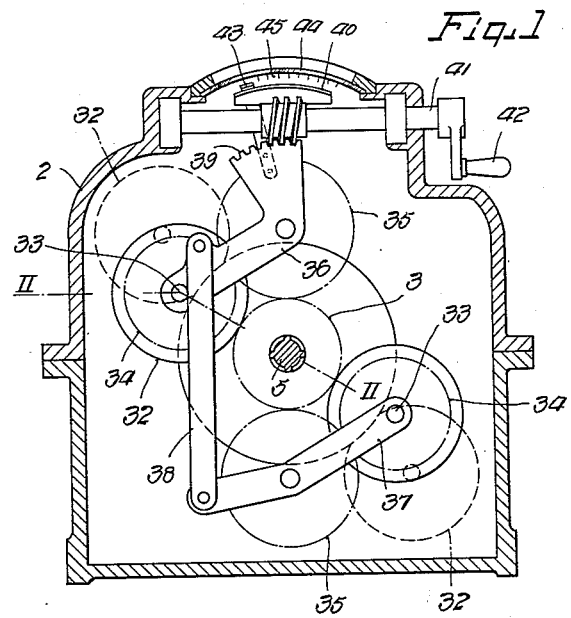

Oct. 30, 1962 SABURO KANO 3,060,758
STEPLESS SPEED CHANGE GEAR
Filed March 4, 1960 2 Sheets-Sheet 1

INVENTOR.
SABURO KANO

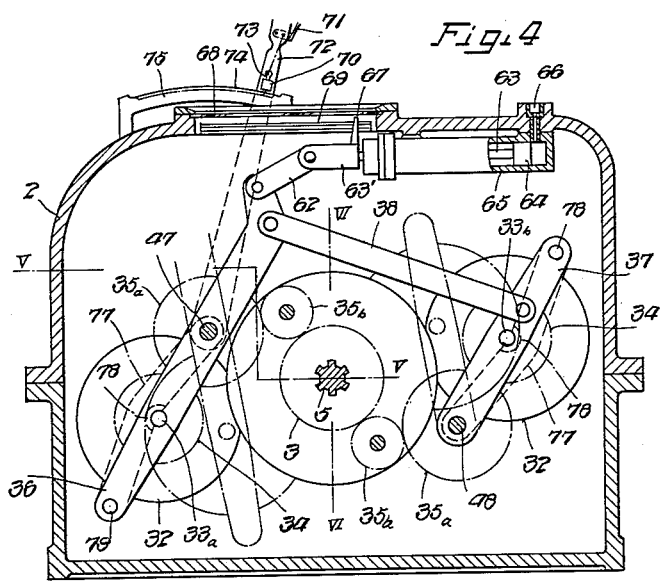
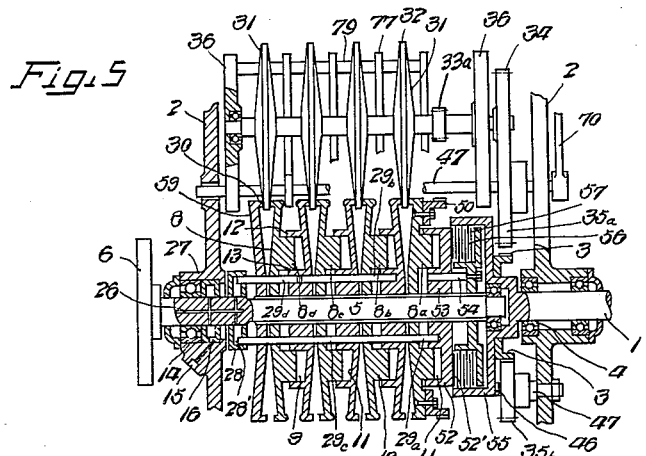
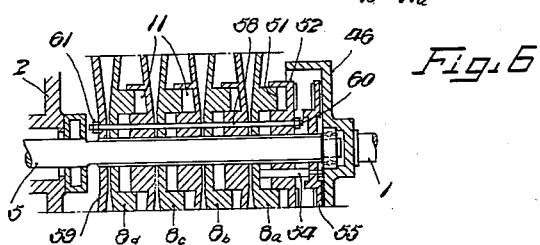

United States Patent Office 3,060,758
Patented Oct. 30, 1962

3,060,758
STEPLESS SPEED CHANGE GEAR
Saburo Kano, Shibuya-ku, Tokyo, Japan, assignor to Ishikawajima Jukogyo Kabushiki Kaisha, Tokyo, Japan
Filed Mar. 4, 1960, Ser. No. 12,822
18 Claims. (Cl. 74—199)

This invention relates to a stepless speed change gear, comprising a center shaft upon which at least one pair of rotating wheels with peripheral contact rims are mounted relatively movably in the axial direction only and at least two shafts arranged equiangularly and adjustably in distance from said center shaft with their axes lying in a cylindrical surface concentric to said center shaft and each having at least two friction discs fixed thereto which are adapted to be in frictional engagement with said rotating wheels.

The primary object of this invention is to provide a stepless speed change gear of the kind mentioned above which can transmit a movement with a constant horse power or a constant torque, as well as in a relatively great speed ratio and which can function as a clutch in case of need.

In order to obtain this object, according to this invention one of rotating wheels of said pair is provided with an annular projection concentric to said center shaft while the other is provided with an annular groove to receive said projection to form an annular chamber together with said projection which chamber is to be filled with fluid of an adjustable pressure during operation of the gear, whereby said wheels are brought into frictional engagement with said friction discs.

The speed change gear according to this invention has the following remarkable advantages:

(a) Because contact pressures between the wheels and the discs from which frictional forces originate can be increased optionally in case of need, such a great horse power that can not be transmitted by any of the conventional frictional speed change gears, especially using springs for producing frictional forces, can be transmitted.

(b) Because the contact pressures between the wheels and the discs do not exist in case of assembling the gear according to this invention, assemblage of the gear can be performed very easily and simply, especially in comparison with a frictional speed change gear using springs, where assemblage must be performed against resiliences of the springs.

(c) Because the contact pressures between the wheels and the discs are produced by a hydraulic pressure of one and the same pressure source, i.e., a pump, all the contact pressures are uniform and equal over all the wheels, without any ununiform distribution of contact pressure which has been experienced in case of a gear using springs on account of working errors.

(d) Transmission power can be varied from zero to the maximum, as the hydraulic pressure of a pressure source can be adjusted optionally. Namely, by pressurizing pressure medium, oil, of the gear, transmission can be commenced, while by lowering down pressure of the pressure medium to the minimum, transmission can be nullified with the maximum slip between the wheels and the discs. This means that the gear can function as a friction clutch.

(e) The contact pressures between the wheels and the discs can be maintained always constant, irrespective of relative radial positions of the wheels to the discs, in other words, irrespective of relative axial positions of the paired wheels. Therefore, so far as the hydraulic pressure of the pressure medium is maintained constant, the gear according to this invention, when the center shaft serves as a driven shaft, can transmit always a constant torque, but runs with a slip when a torque to be transmitted exceeds the above mentioned constant one, while in case of the center shaft serving as a driving shaft the gear can transmit always a constant horse power, but with a horse power beyond the above mentioned constant one the gear runs also with a slip, with the result that eventual damage to the whole machine assembly including the gear may be prevented from occurring or an electric motor for driving the gear can be prevented from being burnt on account of its overload. This means that the gear according to this invention can perform an ideal transmission of power which can not be performed by any of the conventional frictional speed change gears.

Other objects and features of the invention will become more apparent from the following description and accompanying drawings which show two embodiments of the speed change gear of this invention and in which—

Figure 2:
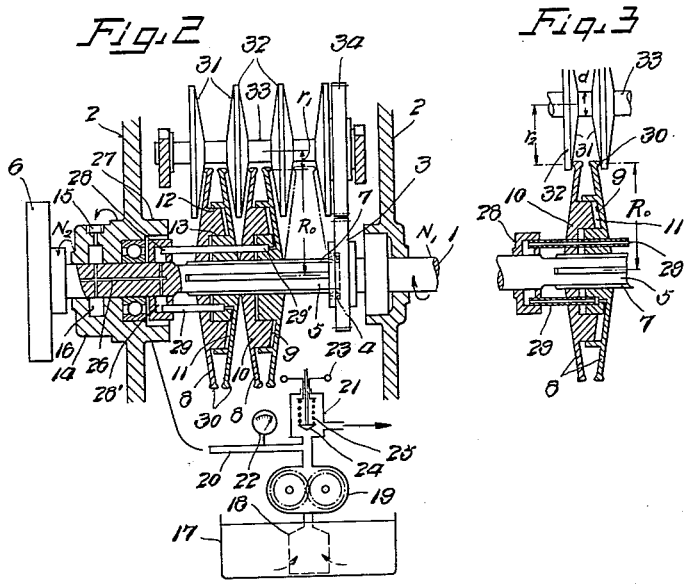
Figure 3:
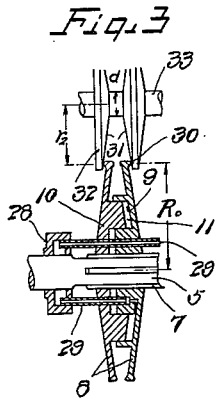

FIG. 1 is a sectional elevation of the first embodiment,

FIG. 2 is a sectional plan view of the same along line II—II in FIG. 1, in a somewhat enlarged scale, in association with a pressure fluid source, FIG. 3 is a sectional plan view of the same similar to FIG. 2, FIG. 4 is a sectional elevation of the second embodiment in the state of the maximum speed transmission, FIG. 5 is a sectional plan view of the same along line V—V in FIG. 4, but in the state of the maximum speed transmission and FIG. 6 is a sectional elevation of the same, partly shown, along line VI—VI in FIG. 4.

Referring to FIGS. 1–3, a driving shaft, i.e., a rotating shaft 1, operatively connected with a prime mover, for example, an electric motor, not shown, is supported rotatably by a casing 2 serving as an oil tank in which a toothed wheel 3 is fixed to the driving shaft 1. A center shaft 5 supported coaxially with the shaft 1 at its one end by a bearing 4 arranged in the toothed wheel 3 has a coupling wheel 6 fixed at its other end projecting through the casing 2 out of the same. This center shaft 5 has a spline part 7 upon which are mounted three pairs of metal friction rotating wheels 8 (one pair of which are shown in FIG. 2 by chain lines) relatively movable in the axial direction only. One of each pair of the rotating wheels is provided on the surface confronting the other rotating wheel with an annular projection 10 concentric to the center shaft 5 while the other wheel is provided in its surface opposite to the projection 10 with an annular groove 9 concentric to the center shaft 5 to receive said projection 10. Namely, between the projection 10 and the groove 9 there is formed a fluid chamber 11 which is made fluid-tight by O rings 12 and 13 arranged on the projection 10 and in the annular inside of the groove 9, respectively.

The casing 2 is provided on its one side with a box-shaped projection 14 in a position where the center shaft 5 passes through the casing 1. This projection 14 includes therein a fluid, for example oil, port 15 and an oil chamber 16 communicating with said port 15 and embracing the center shaft 5. A pump, for example, a gear pump, 19 adapted to suck oil from an oil tank 17 through a strainer 18 is adapted to deliver oil into the oil chamber 16 through a piping 20 and the port 15. In the piping 20 a relief valve device 21 and a pressure gauge 22 are arranged, while a spring 25 arranged in the relief valve device 21 is adjustable in its force acting upon a valve 24 by operation of an adjusting handle 23, with the result that the closing force of the valve can be so regulated that pressure of oil in the piping 20 is adjusted at a desired value.

A passage 26, communicating with the oil chamber 16, is bored centrally in the center shaft 5 and communicates also with a chamber 28' bored in a rotating member 28 which is encircled by an inside annular projection 27 of the casing 2. Tube pieces 29, 29' and 29'' (29'' is not shown in the drawing) having their axes arranged in a cylindrical surface concentric to the center shaft 5 and being planted into the member 28 to communicate with the chamber 28', communicate in turn with the fluid chambers 11 of three pairs of the rotating wheels 8, respectively.

Each of the paired rotating wheels 8 is provided on its outside periphery a projecting contact rim 30 which is adapted to be in frictional engagement with one of the both conical surfaces 31 of each of plural friction discs 32 fixed integrally to each of rotating shafts 33 which are arranged with their axes lying in a cylindrical surface concentric to the center shaft 5 and which are disposed equiangularly and adjustable in distance from the center shaft 5. In the embodiment shown in FIGS. 1–3, two shafts 33 each having four friction discs 32 integrally therewith are disposed diametrically opposite. Each of two toothed wheels 34 keyed to the one end portion of the shaft 33 meshes with the toothed wheel 3 through an idle wheel 35 carried rotatably by the casing 2.

The two rotating shafts 33 are associated with each other in such a manner that, as shown in FIG. 1, the one of the shafts 33 is supported rotatably at its both ends by a forked support lever 36 carried also rotatably by the shaft of the one idle wheel 35, while the other of the shafts 33 is supported rotatably at its both ends by a forked support lever 37 carried also rotatably by the shaft of the other idle wheel 35 and that these two support levers 36 and 37 are pivoted to both ends of an interconnecting link 38, respectively. A segmental toothed wheel 39 formed at the free end of the support lever 36 meshes with a worm 40 keyed to a shaft 41 supported rotatably by the casing 2 which shaft 41 carries at its end projecting out of the casing 2 an adjusting handle 42 through which the shaft 41 can be rotated by hand in case of need. A pointer needle 43 fixed at its one end to the segmental wheel 39 and visible from outside through a transparent wall 44 of glass or the like fitted in the casing 2 is adapted to cooperate with a scale plate 45 fixed to the casing 2.

The above-mentioned speed change gear as an embodiment of this invention operates as follows:

FIGS. 1 and 2 show a state of the change gear in which a low speed transmission is effected. In this state, rotation of the rotating shaft 1 is transmitted through the gear train 3, 35 and 34 to the two groups of the friction discs 32, with which the rotating wheels 8 are in contact through their peripheral rims 30 under oil pressure in the oil chambers 11, so that the rotation is transmitted to the center shaft 5.

In order to effect a high speed transmission from the state of the gear mentioned above, the shafts 33 of the friction discs 32 are moved synchronously to depart equidistantly from the center shaft 5 till the friction discs 32 reach the outermost positions as shown in FIG. 1 by chain lines and as shown partly in FIG. 3. Namely, FIG. 3 shows a relation of the friction discs 32 to the rotating wheels 8 in case of the highest speed transmission. In the speed change gear shown, there holds the following equation:

$$\text{Speed ratio} = \frac{\text{maximum number of revolution}}{\text{minimum number of revolution}}$$

$$= \frac{CN_1 \frac{R_0}{r_1}}{CN_1 \frac{R_0}{r_2}} = \frac{r_2}{r_1}$$

where $N_1$ = number of revolution per unit time of the shaft 1,
$R_0$ = radial distance of the contact rim from the center axis of the shaft 5,
$r_1$ = radial distance of the contact rim from the center axis of each of the shafts 33 in case of the lowest speed transmission,
$r_2$ = radial distance of the contact rim from the center axis of each of the shafts 33 in case of the highest speed transmission, and
$C$ = a constant.

This equation shows that the smaller the distance $r_1$ becomes, the greater the speed ratio becomes. Practically speaking, as the diameter $d$ of each of the shafts 33 can be made small sufficiently, the speed ratio can be made great easily, with the result that in the change gear of this invention the speed ratio can be increased without difficulty up to 5–10, whereas in a conventional speed change gear the speed ratio used to amount to at highest 3.5–4.5.

In the speed change gear mentioned above the rotating shaft 1 serves as a driving shaft and in this case the machine parts on the driven shaft side can be protected against damage because slip occurs between the friction discs 32 and the rotating wheels 8 when a torque to be transmitted exceeds a determined constant one, but if the rotating shaft 1 serves as a driven shaft vice versa, slip occurs between the friction discs 32 and the rotating wheels 8 when a horsepower to be transmitted exceeds a certain constant value, irrespective of number of revolution of the driven shaft, with the result that a prime mover operatively connected with the change gear can be prevented from being overloaded.

The pressure in the chamber 11 formed between the paired rotating wheels 8 can be read in the pressure gauge 22 and can be adjusted by adjustment of elastic force of the spring 25 by means of the adjusting handle 23. As a surplus oil pressure in the piping 20 can be released by the relief valve device 21, the pressure in the chamber 11 is maintained always at a determined constant value. Because the pressure in the piping 20 can be lowered down to zero by the relief valve device 21 in case of need, and in this case the speed change gear is put out of operation practically, the gear can function as a clutch device.

The second embodiment of this invention shown in FIGS. 4–6 differs from the first embodiment shown in FIGS. 1–3 substantially in the points that in the former thrust blocks are provided for avoiding bending of the friction discs arranged on the both extremities of the friction disc group in conseqnence of axial thrusts originating from contact of the rotating wheels with the friction discs, and also for avoiding bending of the shaft of the friction discs owing to radial thrusts originating from the conical form of the friction discs, and that the minimum speed transmission is effected only through a toothed gear train while the maximum speed transmission is effected directly by a friction disc clutch. As the second embodiment coincides with the first one fundamentally in other respects, same referential numerals are used in FIGS. 4–6 for denoting parts same with, similar or equivalent to those shown in FIGS. 1–3.

In the second embodiment, as shown in FIG. 5, a rotating shaft 1 is provided at its free end with the clutch half 46 of a friction disc clutch as will be explained later, to the back side of which half 46 is fixed a toothed wheel 3 meshing with intermediate toothed 35b supported rotatably by the casing 2 and meshing with other intermediate toothed wheels 35a which are supported through bearings by shafts 47, 48 to which are fixed integrally supporting levers 36 and 37, respectively, and which are supported rotatably by the casing 2. The toothed wheels 35a mesh with toothed wheels 34 keyed to the shafts 33a and 33b, to each of which is also keyed a pinion 49 meshing with a special toothed wheel 50 fixed to the rotating wheel 51 of one extreme pair of the rotating wheel group, which consists of four pairs 8a, 8b, 8c and 8d of rotating wheels in this case. This rotating wheel 51 is so connected with the other clutch half 55 of the friction disc clutch through three connecting rods 54 arranged equiangularly around the center shaft 5 and passing loosely through holes 53 in the rotating wheel 52 pairing with the rotating wheel 51 to constitute the extreme pair 8a as to be rotatable together with the clutch half 55, which is mounted on the center shaft 5 movably in the axial direction only and which carries thereon a plurality of friction discs 56 cooperating with a plurality of friction discs 57 carried by the clutch half 46, as well known in the art.

In case of operation of the gear, pressure fluid e.g., presusre oil, is fed through tubes 29a, 29b, 29c and 29d to the oil chambers 11 of the pairs 8a, 8b, 8c and 8d of the rotating wheels, as clearly shown in FIG. 5. Three axial tie rods 58 (only one of which is shown in FIG. 6) arranged equiangularly around the center shaft 5 and passing loosely through the rotating wheels of all the four pairs 8a, 8b, 8c and 8d, interconnect by means of nuts 60, 61 the rotating wheel 52 with a balancing rotating wheel or end disc 59 mounted also on the center shaft 5 movably in the axial direction only. In the second embodiment, as shown in FIG. 5, differing from the first embodiment shown in FIGS. 1–3, the outside surface 31 of each of the both extreme friction discs 32 o fthe friction disc group is made also conical and is in frictional engagement with the rotating wheel 51 or the balancing end disc 59, which serves as a thrust block as will be explained later.

The forked support lever 36 supporting the shaft 33a is pivoted at its free end to one end of a connecting lever 62 to the other end of which is pivoted a forked piece 63' fixed to the free end of a piston rod 63 whose other end constituting a piston 64 is inserted fluid-tightly but slidably into a cylinder 65 fixed integrally to the casing 2, into which cylinder 65 opens a fluid feed passage 66. Feed passage is connected to line 20 to provide the same pressure therein as in fluid chamber 11. A pointer needle 67 fixed to the forked piece 63' at the free end of the rod 63 is adapted to cooperate with a scale plate 69 visible through a glass plate 68 fixed in the casing 2.

A speed change lever 70 is fixed at its one end to one end of the shaft 47 projecting out of the casing 2. A grip piece 71 pivoted to the other end of the lever 70 is connected through a wire rope 72 with a spring-loaded stop pawl 73 which is adapted to cooperate with a serration 74 of an arcuate plate 75 fixed to the casing and arranged concentrically to the shaft 47. By operating the lever 70 together with the grip piece 71 the levers 36 and 37 can swing and then stop within ranges between their positions shown by full lines and those shown by chain lines in FIG. 4.

Between the both side pieces of each of the support levers 36 and 37, several bent pieces 77 each arranged parallelly to the side pieces on one side of each of the friction discs 32 and pressed through a bearing piece 78 against the shaft 33a or 33b are fixed integrally to the shafts 47 and 48 as well as to connecting rods 79, respectively, each interconnecting the free ends of the both side pieces of each of the support levers 36 and 37. These bent pieces 77 serve as thrust block means as will be explained later.

The speed change gear of the second embodiment operates as follows:

When the speed change gear is put into operation at first and the friction disc shafts 33a, 33b are in an innermost position, the rotation of the rotating shaft 1 is transmitted to the center shaft 5 through the toothed wheel train 3, 35b, 35a, 34, 49 and 50 as well as through the rotating wheel 51, whereby the minimum speed transmission is effected. During this minimum speed, transmission is accomplished by means of the toothed wheel train only, pressure oil is fed to the oil chambers 11 of the rotating wheel pairs 8a, 8b, 8c and 8d, but do not press the contact rims 30 of the wheels 8 against the friction discs 32. Thus, in this embodiment at the beginning of power transmission an eventual loss in power due to leakage or incomplete charging of pressure fluid can be prevented by avoiding frictional power transmission at the time of start of the speed change gear which may continue for a relatively long time. Furthermore, so far as starting of the speed change gear should be performed always in a state of the change gear where the minimum speed transmission is effected, partial abrasion of the friction discs can be also avoided by transmission by means of the toothed wheel train mentioned above.

After the change gear has started and the machine to be driven by the gear train has attained proper starting speed, the lever 70 may be shifted to a desired position corresponding to a desired speed transmission by lifting stop pawl 73 by movement of sub-lever 71 so that the pinion 49 is disengaged from the toothed wheel 50, and a purely frictional power transmission is effected through the friction discs 32 and the rotating wheels 8. In this case each of the shafts 33a and 33b is subjected to a radial thrust originating from the sum of oil pressures acting upon the conical surfaces 31 of the friction discs 32 of each of the two friction disc groups, so that the shafts 33a and 33b tend to bend outwardly. In order to balance and absorb this radial thrust, a thrust block means is provided in the second embodiment, which consists of a plurality of bent pieces 77 mentioned above. By provision of the thrust block means the shafts 33a and 33b can be made thin as much as possible enough to transmit rotation, whereby the greatest speed ratio possible of the change gear increases remarkably. This is true because the radius $r_1$ shown in FIG. 2 can be made of a minimum diameter. As shown in FIG. 4, the free end of the forked support lever 36 is connected with the piston rod 63 constituting the piston 64 at its one end which is adapted to be subjected to pressure of the pressure oil in the cylinder 65 to be delivered from a pressure oil source which is adapted to deliver pressure oil to the oil chambers 11 of the rotating wheels 8. The pressure of the oil in the cylinder 65, therefore, opposes the radial thrust acting upon the shafts 33a and 33b and can be balanced through the parts 64, 63, 63', 62, 36 and 77, on one hand, as well as through the parts 64, 63, 63', 62, 38, 37 and 77, and facilitates operation of the speed change lever 70 by reducing an external force necessary for operating the lever 70.

While in the embodiment shown in FIGS. 1–3 each of the extreme friction discs 32 of the friction disc group has one conical surface only on its one side and is adapted to be in frictional engagement on this surface with the contact rim 30 of each of the extreme rotating wheels 8, so that the both extreme friction discs 32 tend to bend outwardly, in the second embodiment shown in FIGS. 4–6 the both extreme friction discs 32 are shaped conical on their both surfaces and are adapted to be in frictional engagement on these surfaces with one rotating wheel 8 of the pair 8b and the rotating wheel 51 of the pair 8a as well as one rotating wheel 8 of the pair 8d and the end disc 59, respectively, which is pulled through the tie rods 58 by the rotating wheel 52 under a pressure equal to that in the chamber 11. The rotating wheel 51 and the end disc 59 which are connected relatively movably through the tie rods 58 as mentioned above, thus, serve as axial thrust block means for compensating axial thrusts exerted on the extreme friction discs, whereby the bending stresses in the extreme friction discs during operation of the change gear can be avoided, so that a remarkably high pressure of the pressure oil can be utilized, resulting in a high power transmission of the change gear.

In the second embodiment shown in FIGS. 4–6, when the speed of the center shaft 5 is increased by operating the speed change lever 70 up to its maximum value and the rotating wheels 8 of each pair depart from the shafts 33a and 33b of the friction discs 32 by the maximum radial distance, as well as from each other by the maximum axial distance therebetween, the rotating wheel 52 presses through an annular plate 52' fixed thereto the friction discs 56 of the clutch half 55 against those 57 of the clutch half 46, so that these clutch halves 55 and 46 are connected together integrally in operation to transmit the rotation of the driving shaft 1 directly to the center shaft 5. For this purpose, in this embodiment, the direction of rotation of the center shaft 5 is made always same with that of the driving shaft 1 and the rotating wheels 8 of all the pairs must be so dimensioned that when every paired rotating wheels 8 depart from each other by the maximum axial distance, two adjacent rotating wheels of two adjacent rotating wheel pairs touch each other with their back sides, with the result that no friction discs 32 are in frictional engagement with the contact rims 30 of all the rotating wheels 8, whereas the friction discs of the clutch are in frictional engagement altogether. By this direct transmission of the maximum speed by means of the friction clutch, durability of the speed change gear, especially those of the friction discs and the rotating wheels can be extended extremely.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A stepless speed change gear, comprising a center shaft upon which at least one pair of rotating wheels with peripheral contact rims are mounted relatively movably in the axial direction only, at least two shafts arranged equiangularly and adjustably in distance from said center shaft and each having at least two friction discs fixed thereto which are adapted to be in frictional engagement with said rotating wheel rims, one rotating wheel of said pair being provided with an annular projection concentric to said center shaft, and the other being provided with an annular groove to receive said projection to form an annular chamber together with said projection, and fluid pressure means connected to said chamber to fill said chamber with fluid of an adjustable pressure during operation of the gear, whereby said wheels are brought into frictional engagement with said friction discs.

2. A stepless speed change gear according to claim 1, wherein said pressure fluid is fed to said fluid chamber from a pump whose discharge pressure can be adjusted by a relief valve device inserted into a delivery passage of the pump.

3. A stepless speed change gear according to claim 1, wherein a toothed wheel train is provided between the center shaft and friction disc shafts in such a manner that at the innermost position of friction disc shafts the toothed wheels of the train are connected rigidly to one of said rotating wheels, for effecting the minimum speed transmission by means of said train only in case of starting the speed change gear.

4. A stepless speed change gear according to claim 1, including support levers carrying rotatably the shaft of each of said friction discs, a thrust block means in each of said supporting levers for receiving radial thrusts to be exerted on said shaft.

5. A stepless speed change gear according to claim 1, including a driving shaft and wherein the direction of rotation of said center shaft is made always the same with that of said driving shaft, and a friction clutch is provided between said driving shaft and the center shaft for effecting the maximum speed transmission by means of said clutch.

6. A stepless speed change gear according to claim 1, wherein a fluid cylinder is provided for balancing radial thrusts to be exerted on the shafts of said friction discs, said cylinder enclosing therein slidably a piston whose rod is connected operatively to support levers each carrying said shafts.

7. A stepless speed change gear according to claim 6, wherein said fluid pressure means is connected to said cylinder to supply said cylinder with fluid whose pressure is equal to that of the fluid to be contained in said fluid chamber.

8. A stepless speed change gear according to claim 6, wherein a speed change lever is associated operatively to said cylinder support levers.

9. A stepless speed change gear, comprising a center shaft upon which at least one pair of rotating wheels with peripheral contact rims are mounted relatively movably in the axial direction only, and at least two shafts arranged equiangularly and adjustably in distance from said center shaft and each having at least two friction discs fixed thereto which are adapted to be in frictional engagement with said rotating wheels, wherein a toothed wheel train is provided between said center shaft and said friction disc shafts in such a manner that at the innermost position of the friction disc shafts the toothed wheels of the train are connected rigidly to one of said rotating wheels for effecting the minimum speed transmission by means of said train only in case of starting the speed change gear.

10. A stepless speed change gear, comprising a center shaft upon which at least three pairs of rotating wheels with peripheral contact rims are mounted relatively movably in the axial direction only, and at least two shafts arranged equiangularly and adjustably in distance from said center shaft with their axes lying in a cylindrical surface concentric to said center shaft and each having at least two friction discs fixed thereto which are adapted to be in frictional engagement with said rotating wheels, wherein all said friction discs are shaped conical on their both surfaces and two extreme rotating wheels are mounted on said center shaft and provided for being in frictional engagement with the extreme conical surfaces of the extreme ones of said friction discs, said extreme rotating wheels being interconnected relatively movably by tie rods.

11. A stepless speed change gear, comprising a center shaft upon which at least one pair of rotating wheels with peripheral contact rims are mounted relatively movably in the axial direction only, and at least two shafts arranged equiangularly and adjustably in distance from said center shaft with their axes lying in a cylindrical surface concentric to said center shaft and each having at least two friction discs fixed thereto which are adapted to be in frictional engagement with said rotating wheels, a support lever rotatably carrying the shaft of each of said friction discs in a thrust block means provided on each of support levers for receiving radial thrusts to be exerted on said shaft.

12. A stepless speed change gear, comprising a center shaft upon which at least one pair of rotating wheels with peripheral contact rims are mounted relatively movably in the axial direction only, and at least two shafts arranged equiangularly and adjustably in distance from said center shaft and each having at least two friction discs fixed thereto which are adapted to be in frictional engagement with said rotating wheels, a driving shaft, wherein the direction of rotation of said center shaft is made always the same as that of said driving shaft, and a friction clutch between said driving shaft and said center shaft for effecting the maximum speed transmission by means of said clutch at the outermost position of the friction disc shafts.

13. A stepless speed change gear, comprising a center shaft upon which at least two pairs of rotating wheels with peripheral contact rims are mounted relatively movably in the axial direction only, and at least two shafts arranged equiangularly and adjustably in distance from said center shaft with their axes lying in a cylindrical surface concentric to said center shaft and each having at least two friction discs fixed thereto which are adapted to be in frictional engagement with said rotating wheels, each of said rotating wheel pairs being dimensioned that when each of the individual rotating wheels of said pairs depart from each other by the maximum axial distance therebetween, two adjacent rotating wheels of two adjacent rotating wheel pairs touch each other with their back sides.

14. A stepless speed change gear, comprising a center shaft upon which at least three pairs of rotating wheels with peripheral contact rims are mounted relatively movably in the axial direction only, at least two shafts arranged equiangularly and adjustably in distance from said center shaft with their axes lying in a cylindrical surface concentric to said center shaft and each having at least two friction discs fixed thereto which are adapted to be in frictional engagement with said rotating wheels, one of rotating wheels of said pair being provided with an annular projection concentric to said center shaft, and the other being provided with an annular groove to receive said projection to form an annular chamber together with said projection, and fluid pressure means connected to said chamber to fill said chamber with fluid of an adjustable pressure during operation of the gear, whereby said wheels are brought into frictional engagement with said friction discs, wherein all said friction discs are shaped conical on their both surfaces and two extreme rotating wheels are mounted on said center shaft and provided for being in frictional engagement with the extreme conical surface of the extreme ones of said friction discs, said extreme rotating wheels being interconnected relatively movably by tie rods.

15. A stepless speed change gear, comprising a center shaft upon which at least two pairs of rotating wheels with peripheral contact rims are mounted relatively movably in the axial direction only, and at least two shafts arranged equiangularly and adjustably in distance from said center shaft with their axes lying in a cylindrical surface concentric to said center shaft and each having at least two friction discs fixed thereto which are adapted to be in frictional engagement with said rotating wheels, one of the rotating wheels of said pair being provided with an annular projection concentric to said center shaft, and the other being provided with an annular groove to receive said projection to form an annular chamber together with said projection, which chamber is to be filled with fluid of an adjustable pressure during operation of the gear, whereby said wheels are brought into frictional engagement with said friction discs, wherein the rotating wheels of all the pairs are so dimensioned that when each of the individual rotating wheels of one of said pairs depart from each other by the maximum axial distance therebetween, two adjacent rotating wheels of two adjacent rotating wheel pairs touch each other with their back sides.

16. A speed gear, comprising a first shaft, at least one pair of rotating wheels having complementary mating sides contoured to define a fluid pressure chamber therebetween, at least one second shaft, at least two friction discs on said second shaft disposed to lie in planes on each side of said rotating wheel pair, means for supporting said second shaft for movement toward and away from said first shaft to present said friction discs at various radial positions from said first shaft in alignment with said pair of rotating wheels, and means to pressurize said fluid pressure chamber to separate the wheels of said pair of rotating wheels and move them into operative engagement with the discs on each side thereof.

17. A speed gear according to claim 16, wherein said discs include widened central portions and are tapered outwardly to the periphery thereof.

18. A speed gear according to claim 16, including at least two pairs of rotating wheels adjacent wheels of adjacent pairs cooperating to engage a single disc during operation thereof.

References Cited in the file of this patent

UNITED STATES PATENTS

| | | |
|---|---|---|
| 1,823,226 | Abbott | Sept. 15, 1931 |
| 2,556,359 | Browne | June 12, 1951 |
| 2,880,623 | Beier | Apr. 7, 1959 |